(12) United States Patent
Miller et al.

(10) Patent No.: US 9,702,899 B2
(45) Date of Patent: Jul. 11, 2017

(54) PEDOMETER WITH LAG CORRECTION

(71) Applicant: Apple Inc., Cupertino, CA (US)

(72) Inventors: Isaac Thomas Miller, El Granada, CA (US); Glenn Donald MacGougan, San Jose, CA (US); Xiao Xiao, Orinda, CA (US)

(73) Assignee: Apple Inc., Cupertino, CA (US)

(*) Notice: Subject to any disclaimer, the term of this patent is extended or adjusted under 35 U.S.C. 154(b) by 40 days.

(21) Appl. No.: 14/846,619

(22) Filed: Sep. 4, 2015

(65) Prior Publication Data

US 2017/0067933 A1   Mar. 9, 2017

(51) Int. Cl.
*G01P 21/00*   (2006.01)

(52) U.S. Cl.
CPC ..................... *G01P 21/00* (2013.01)

(58) Field of Classification Search
CPC ....................................................... G01P 21/00
See application file for complete search history.

(56) References Cited

U.S. PATENT DOCUMENTS

| | | | |
|---|---|---|---|
| 5,583,776 A * | 12/1996 | Levi | A43B 3/0005 701/300 |
| 6,546,336 B1 * | 4/2003 | Matsuoka | G01C 22/006 701/408 |
| 2013/0085677 A1 | 4/2013 | Modi et al. | |

* cited by examiner

*Primary Examiner* — Laura Martin
*Assistant Examiner* — Alex Devito
(74) *Attorney, Agent, or Firm* — Fish & Richardson P.C.

(57) ABSTRACT

Systems, methods and computer-readable storage mediums are disclosed for a pedometer with lag correction. In some implementations, a method comprises: determining, by a first pedometer of an electronic device, a first step count based on sensor data provided by a motion sensor of the electronic device; determining, by a second pedometer of the electronic device, a second step count based on a window of the sensor data; responsive to determining that a step was detected by the second pedometer, determining a third step count based on the window of sensor data; and determining a corrected step count based on the third step count.

20 Claims, 5 Drawing Sheets

PEDOMETER WITH LAG CORRECTION

TECHNICAL FIELD

This disclosure relates generally to digital pedometers.

BACKGROUND

Digital pedometers and odometers are of increasing interest to both the fitness community and the general population as a way to track calorimetry and other exercise metrics for the purposes of marking personal progress, comparing achievements against others and motivating various fitness goals. Some key metrics measured by the pedometer are step count and distance traveled. Step count is the number of steps the user has taken as a function of time and distance traveled is the step count multiplied by stride length. For many applications, it is critical that the step count be both accurate by reporting the correct amount of steps and prompt by reporting each step immediately.

SUMMARY

Systems, methods and non-transitory, computer-readable storage mediums are disclosed for a digital pedometer with lag correction.

In some implementations, a method comprises: determining, by a first pedometer of an electronic device, a first step count based on sensor data provided by a motion sensor of the electronic device; determining, by a second pedometer of the electronic device, a second step count based on a window of the sensor data; responsive to determining that a step was detected by the second pedometer, determining a third step count based on the window of sensor data; and determining a corrected step count based on the third step count.

In some implementations, a system comprises: one or more processors; memory coupled to the one or more processors and configured to store instructions, which, when executed by the one or more processors, causes the one or more processors to perform operations comprising: determining, by a first pedometer of an electronic device, a first step count based on sensor data provided by a motion sensor of the electronic device; determining, by a second pedometer of the electronic device, a second step count based on a window of the sensor data; responsive to determining that a step was detected by the second pedometer, determining a third step count based on the window of sensor data; and determining a corrected step count based on the third step count.

Particular implementations disclosed herein provide one or more of the following advantages. A prompt digital pedometer is combined with a lagged but more accurate digital pedometer to detect missed steps without incurring significant false positives. The missed steps are added to the step count instantaneously or over time to improve the accuracy of a current step count.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Modern fitness and portable personal computing devices (e.g., personal pedometer, smart phones, smart watches) often implement pedometer functions using on-device sensors such as accelerometers, rate gyroscopes and the like. For example, some devices count steps by counting the number of times the accelerometer exceeds a step detection threshold. This type of digital pedometer is prompt but inaccurate, as many user activities other than steps can cause accelerations that exceed the step detection threshold. Another type of pedometer uses frequency domain techniques to look for strong signals at typical human walking or running frequencies. This type of digital pedometer is extremely accurate, as it only declares steps in the presence of a strong periodic signal. A strong periodic signal, however, is difficult for a user to generate except when engaged in fundamentally periodic activities such as walking and running Unfortunately, this type of digital pedometer is not prompt because it requires in some cases several seconds of sensor data to build up in a frequency filter before the filter can declare that the user is stepping. As a result, this type of pedometer is slow to respond and often underreports steps taken because it cannot make up for missed steps that fail to satisfy its detector.

A novel digital pedometer system and method is disclosed that uses both types of digital pedometers (prompt/inaccurate and lagged/accurate) to detect missing steps from a recent history of sensor data, as described below in reference to FIGS. 1-5.

Example System

Figure 1:
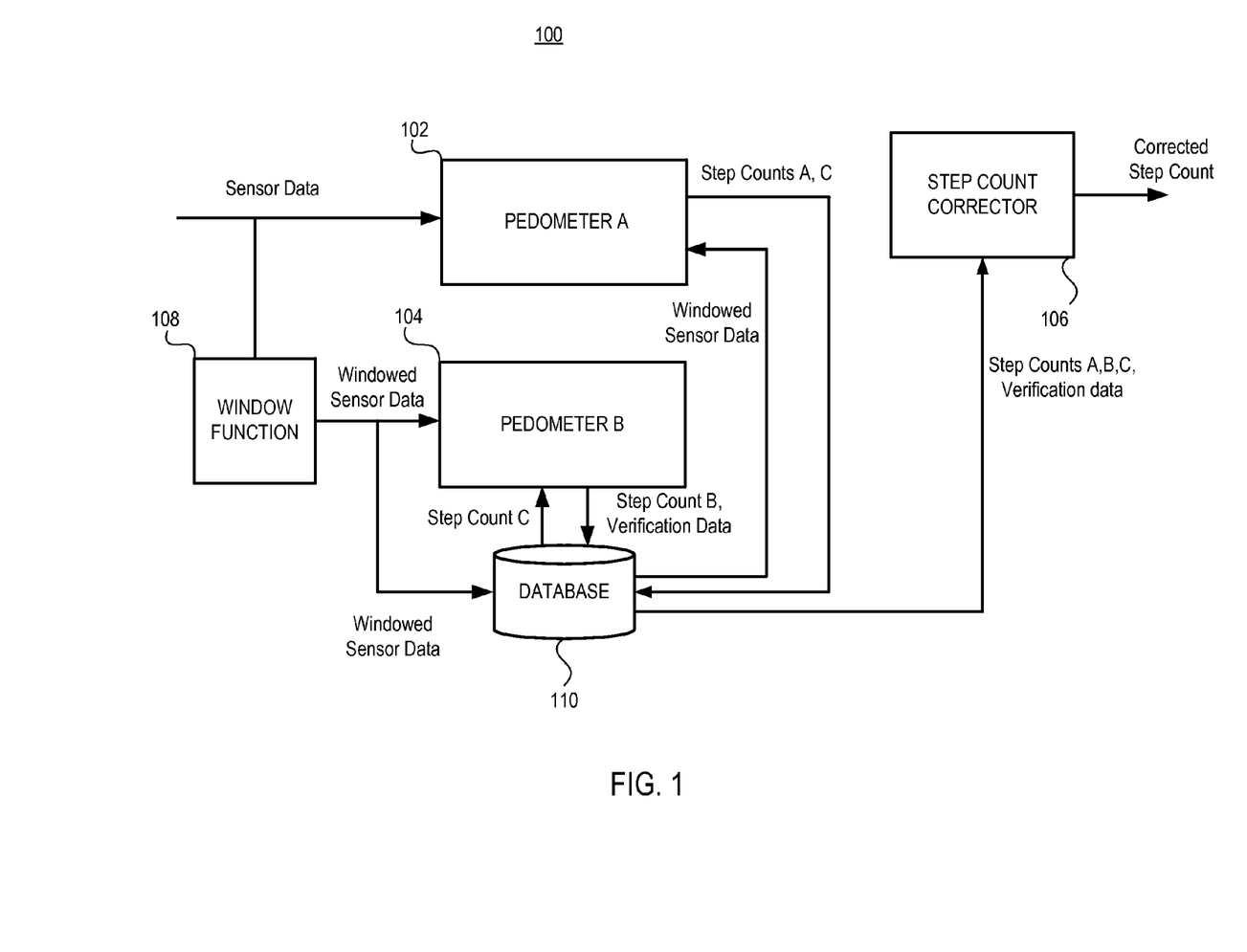
FIG. 1 is a block diagram illustrating an example pedometer system with lag correction.

FIG. 1 is a block diagram illustrating an example pedometer system with lag correction. In some implementations, pedometer system 100 can include pedometer 102 (Pedometer A), pedometer 104 (Pedometer B), step count corrector 106, window function 108 and database 110. Pedometer 102 is a "prompt" pedometer that is capable of providing a step count quickly, but often with less accuracy (e.g., more false positives) than pedometer 104. Pedometer 104 lags due to frequency filtering, but often provides better accuracy than pedometer 102 due to the frequency filtering. Although the example implementation shown in FIG. 1 includes one prompt pedometer 102 and one accurate pedometer 104, other implementations can include one or more prompt pedometers and one or more accurate pedometers.

Motion sensor data is input into pedometer 102. The sensor data can be, for example, acceleration data, gyroscopic rate data, magnetometer data, barometer data, optical camera data, etc. For example, sensor data can be a vector of raw acceleration data in three dimensions or it can be a magnitude of the acceleration vector. If the sensor data is raw acceleration data, pedometers 102, 104 can calculate the magnitude. For example, the magnitude $a_{mag}$ of an acceleration vector $a=<a_x, a_y, a_z>$ provided by a 3-axis (x, y, z axes) accelerometer is given by, $$a_{mag}=|a|=\sqrt{a_x^2+a_y^2+a_z^2}. \quad [1]$$

Figure 2A:
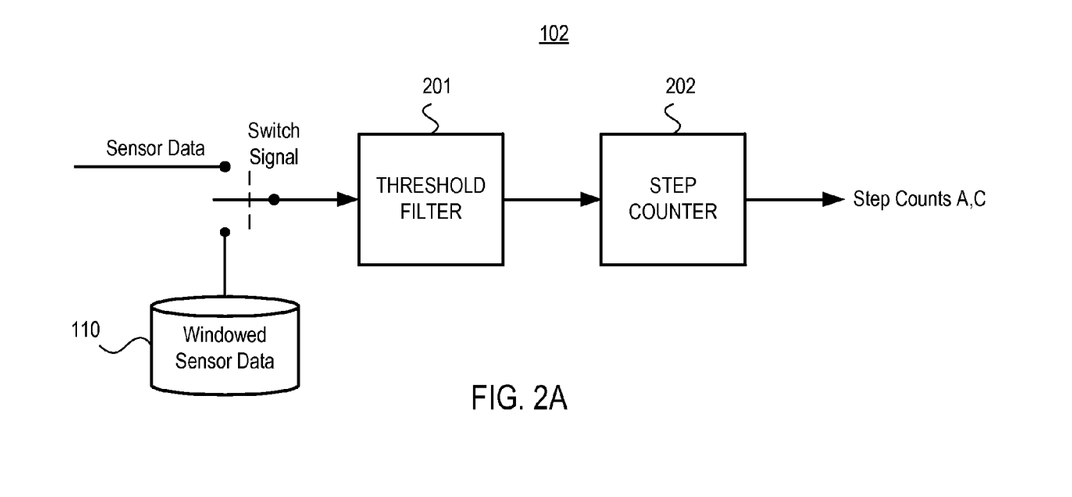
FIG. 2A is a block diagram of the example prompt digital pedometer shown in FIG. 1.
Figure 2B:
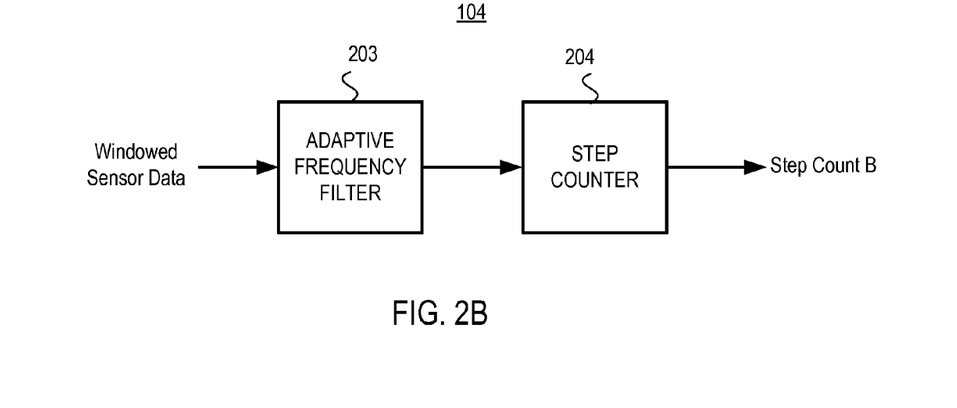
FIG. 2B is a block diagram of the example accurate digital pedometer shown in FIG. 1.

The magnitude $a_{mag}$ is used by pedometers 102, 104 to determine step counts A and B, respectively, as described in reference to FIGS. 2A and 2B. Step counts A and B are stored in database 110 where they can be retrieved by step count corrector 106. A window of $a_{mag}$ values is input to pedometer 104 to determine step count B as described in reference to FIG. 2B. Window function 108 can be, for example, a sliding rectangular window function or any other finite or infinite horizon windowing functions. The window of $a_{mag}$ values is also stored in database 110 and represents a recent history of sensor data.

Step count corrector 106 retrieves step count A and step count B from database 110 after each window of sensor data is processed by pedometer 104 and stored in database 110. When pedometer 104 has an incomplete window of data, pedometer 102 is used exclusively to determine true step count. When pedometer 104 has a full window of data, a combination of step counts A and B from pedometers 102 and 104 are used to determine the corrected step count. If step count B equals 0 (no steps detected over the window), it is assumed that step count A includes all false positives. In this case, all steps detected by pedometer 102 in the current window of pedometer 104 are subtracted from the current step account to generate a corrected step count. If, however, step count B is greater than 0 (at least one step was detected over the window), prompt pedometer 102 reprocesses the stored windowed sensor data and generates a revised step count C. Prior to processing the stored windowed data, pedometer 102 adjusts (e.g., lowers) its step detection threshold to increase the step detection rate, as described in reference to FIG. 3. After the stored windowed sensor data is processed by pedometer 102 and step count C is generated, step count corrector 106 compares step counts A and C to determine a corrected step count. For example, step count A can be subtracted from step count C to determine the number of steps missed by pedometer 102. The number of missed steps can be added to the current count to generate a corrected step count.

In some implementations, as the window of data input into pedometer 104 advances, historical steps generated by pedometer 102 at its increased detection rate can be later verified or disproved by pedometer 104 to refine step count C. It is possible that lowering the threshold for pedometer 102 will increase its detection rate but also its false positive rate. To address this problem, when both pedometers 102 and 104 are available to produce step counts (i.e., pedometer 104 has a full window of sensor data), one pedometer can be used to verify the other pedometer. For example, when pedometer 104 detects steps, pedometer 102 can lower its detection threshold (the user is probably walking/running and will probably continue to do so). When the system 100 is operating in this lowered-threshold manner, pedometer 102 can report all detections as candidate steps that are tentatively added to database 110. As the windowed data advances, pedometer 104 verifies or disproves these tentative steps with a delay. For steps that were detected and then later verified, no change is made to the current step count. For steps that were detected and then later disproven, each of the disproved steps removes one step from the current step count. In some implementations, timestamps and/or time offsets for candidate steps can be stored in database 110 for verifying or disproving candidate steps by facilitating cross-comparing of steps from two or more pedometers 102, 104 in the time domain.

Pedometer system 100 described above detects missed steps without incurring significant false positives. If missed steps are detected, the missed steps can be added to a current step count instantaneously or slowly over time to improve accuracy and promptness. Additionally, false positives can be subtracted from the current step count instantaneously or slowly over time to improve accuracy and promptness.

FIG. 2A is a block diagram of digital pedometer 102 shown in FIG. 1. In some implementations, pedometer 102 can include threshold filter 201 and step counter 202. Pedometer 102 processes real-time sensor data when made available by the sensors (e.g., made available through an API) or stored windowed sensor data retrieved from database 110. In some implementations, a switch signal (e.g., implemented in software) can be generated by database 110 each time step count B is updated in database 110 and has a value greater than 0 (at least one step detected). In other implementations, the switch signal can be generated by pedometer 104 and/or step count corrector 106.

Threshold filter 201 detects crossings of an acceleration magnitude about a step detection threshold. A valid crossing occurs at every transition from a positive slope of the magnitude to a negative slope of the magnitude and between a negative slope to positive slope transition, as described further in reference to FIG. 3. In some implementations, threshold filter 201 uses a fixed (e.g., 1 g) threshold filter. In other implementations, threshold filter 201 can be a moving average of the acceleration magnitude, as described in U.S. Patent Publication No. US 2013/0085677A1, for "Techniques for Improved Pedometer Readings," filed Sep. 30, 2011, which patent publication is incorporated by reference herein in its entirety. Step counter 202 is incremented each time threshold filter 201 detects a step. The output of step counter 202 is either step count A or step count C, depending on whether real-time sensor data or stored windowed sensor data is processed by pedometer 102.

FIG. 2B is a block diagram of digital pedometer 104 shown in FIG. 1. In some implementations, pedometer 104 can include adaptive frequency filter 203 and step counter 204. Pedometer 104 processes windowed sensor data. Adaptive frequency filter 203 transforms the windowed sensor data into the frequency domain so that a fundamental or dominant frequency of the sensor data can be determined. The dominant frequency can be used by adaptive frequency filter 203 to determine a frequency band in which to count threshold detections, as described in U.S. Patent Publication No. US 2013/0085677 A1. Step counter 204 is incremented each time adaptive frequency filter 203 detects a step. The output of step counter 204 is step count B. Because adaptive frequency filter 203 processes a window of sensor data, lag is introduced by frequency filter 203 that can result in missed steps due to the need to accumulate a set of sensor data for frequency filter 203.

Figure 3:
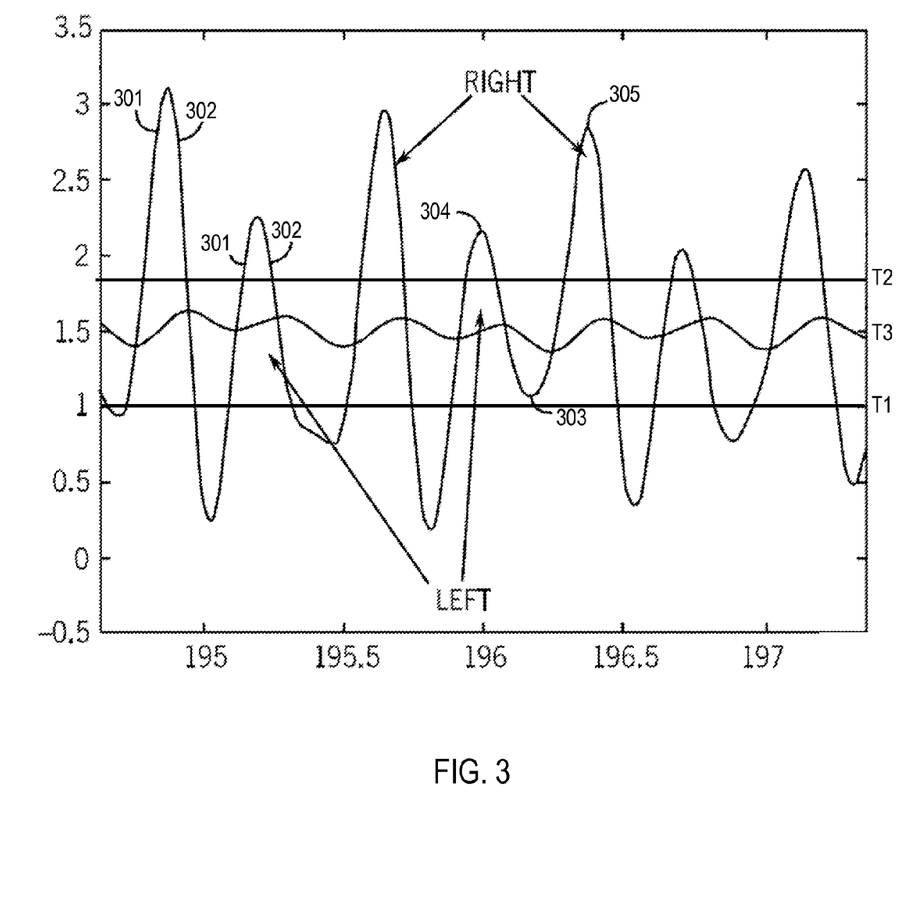
FIG. 3 is a graph that illustrates adjusting the prompt digital pedometer shown in FIG. 1 before processing a stored recent history of sensor data.

FIG. 3 is a graph that illustrates adjusting pedometer 102 before processing windowed sensor data. Pedometer 102 can adjust how it processes windowed sensor data to increase the rate of step detection.

Referring to FIG. 3, crossings of an acceleration magnitude about three different step detection thresholds T1-T3 is shown. A valid crossing occurs at every transition from a positive slope 301 of the acceleration magnitude to a negative slope 302 of the acceleration magnitude and between a negative slope 302 to positive slope 301 transition. When using a fixed threshold T1 (e.g., 1 g) some steps may not be detected due to offsets or shifts in the accelerometer. For example, when a user is running the average acceleration may be higher due to the greater acceleration of each footstep and the overall faster forward motion. Due to the higher offset of average acceleration during running measurements, some negative slope to positive slope threshold crossings may not be detected. For example, the negative slope 302 to positive slope 301 transition at point 303 in the graphed acceleration magnitude does not cross the threshold T1 between peaks 304 and 305. As a result, while peaks 304 and 305 may actually correspond to two steps (e.g., a left step and a right step), threshold T1 may detect only one step due to the lack of a negative to positive transition crossing (e.g., point 303) below the fixed threshold T1.

In some implementations, prior to processing stored windowed sensor data, threshold filter 201 is adjusted to increase the step detection rate to detect missed steps. For example, fixed threshold T1 can be replaced with fixed threshold T2 (e.g., 1.8 g), which is higher than fixed threshold T1. Raising the fixed threshold increases the likelihood of detecting missed steps. In other implementations, fixed threshold T1 can be replaced with an adaptive threshold T3, which can be a moving average of the acceleration magnitude. In some implementations, the moving average can be calculated during frequency analysis of the acceleration magnitude by pedometer 104. In some implementations, the moving average may be the calculated average acceleration magnitude based on an immediately preceding window of the acceleration magnitude.

As represented in the graph of FIG. 3, because the moving average is based on the average acceleration magnitude at each immediately preceding window, the moving average is more likely to have an acceleration value between a negative to positive peak and a positive to negative peak (referred to as peak-to-peak) of the acceleration magnitude. As such, significantly more peak-to-peak crossings of the acceleration magnitude may be detected about threshold T3 than compared to crossings about the fixed threshold T1. For example, while point 303 does not cross below fixed threshold T1, point 303 may cross below threshold T3, resulting in the correct detection of both peaks 304 and 305.

Example Process

Figure 4:
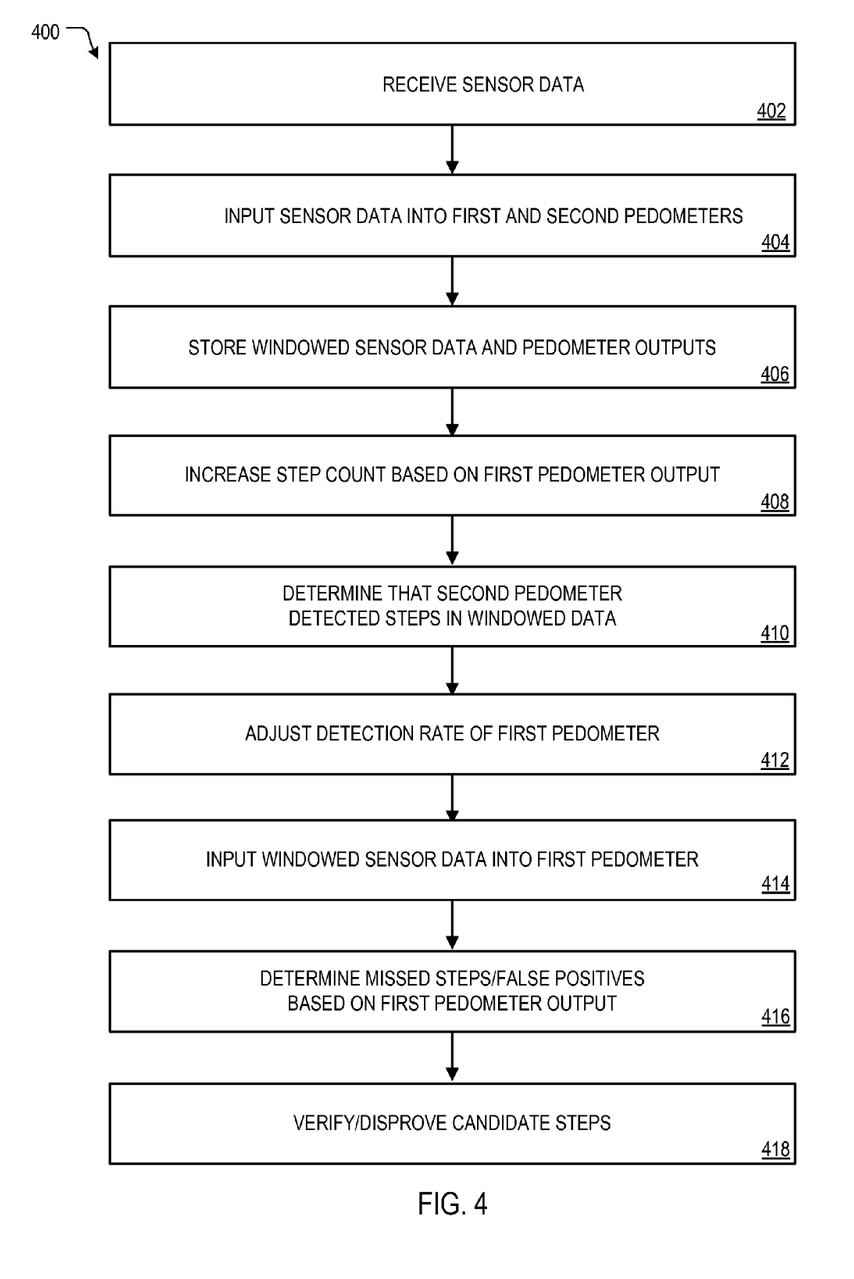
FIG. 4 is a flow diagram of an example pedometer process with lag correction.

FIG. 4 is a flow diagram of an example pedometer process 400 with lag correction. Process 400 can be implemented by mobile device architecture 500, as described in reference to FIG. 5.

In some implementations, process 400 begins by receiving sensor data from a motion sensor (402). For example, an accelerometer and/or rate gyroscope can make acceleration and/or angular rate data available to applications through, for example, an API.

Process 400 can continue by inputting sensor data into two or more pedometers in parallel. A first pedometer can include a threshold filter that counts threshold crossings with a step counter, as described in reference to FIG. 2A. The second pedometer can include an adaptive frequency filter and a step counter, as described in reference to FIG. 2B. The second pedometer is more accurate than the first pedometer (e.g., less missed steps) as it only detects steps in the presence of a strongly-periodic signal. However, the second pedometer requires in some cases several seconds of sensor data to accumulate in an adaptive frequency filter before the filter can safely detect that the user is stepping. In some implementations, one or more prompt pedometers with low time lag and high detection rate are used to identify candidate steps but also have a high false positive rate. Additionally, one or more accurate pedometers are used to confirm, disprove or otherwise correct those candidate steps later into a final step count.

Process 400 can continue by storing a window of sensor data (406). For example, a window function (e.g., rectangular window) can be applied to the sensor data and stored in a database or other data store for later retrieval.

Process 400 can continue by incrementing a current step count based on a first step count generated by the first pedometer (408). For example, a current step count can be stored and provided to applications (e.g., a fitness application) through, for example, an API, where it can be used to compute distance traveled and other metrics. The first pedometer outputs the first step count which is added to a current count, which can also be stored in database 110.

Process 400 can continue by determining that the second pedometer detected at least one step (410). For example, after the pedometer generates a second step count that is stored in database 110. Each time the database is updated with the second step count from the second pedometer, the second step count is checked to see if it is greater than 0.

Process 400 can continue by adjusting the detection rate of the first pedometer to detect missed steps (412). For example, a fixed threshold for detecting crossings of an acceleration magnitude can be raised or can be replaced by an adaptive threshold (e.g., a moving average of the acceleration magnitude).

Process 400 can continue by inputting the stored windowed sensor data into the first pedometer with the adjusted detection rate (414). For example, if at least one step was detected by the second pedometer, a switch signal can be generated (e.g., generated in software) that causes the stored windowed sensor data to be processed by the first pedometer.

Process 400 can continue by determining missed steps based on the output of the first pedometer (416). For example, a third step count generated from the stored windowed data can be compared with the first step count to determine a number of missed steps.

Example Device Architecture

Figure 5:
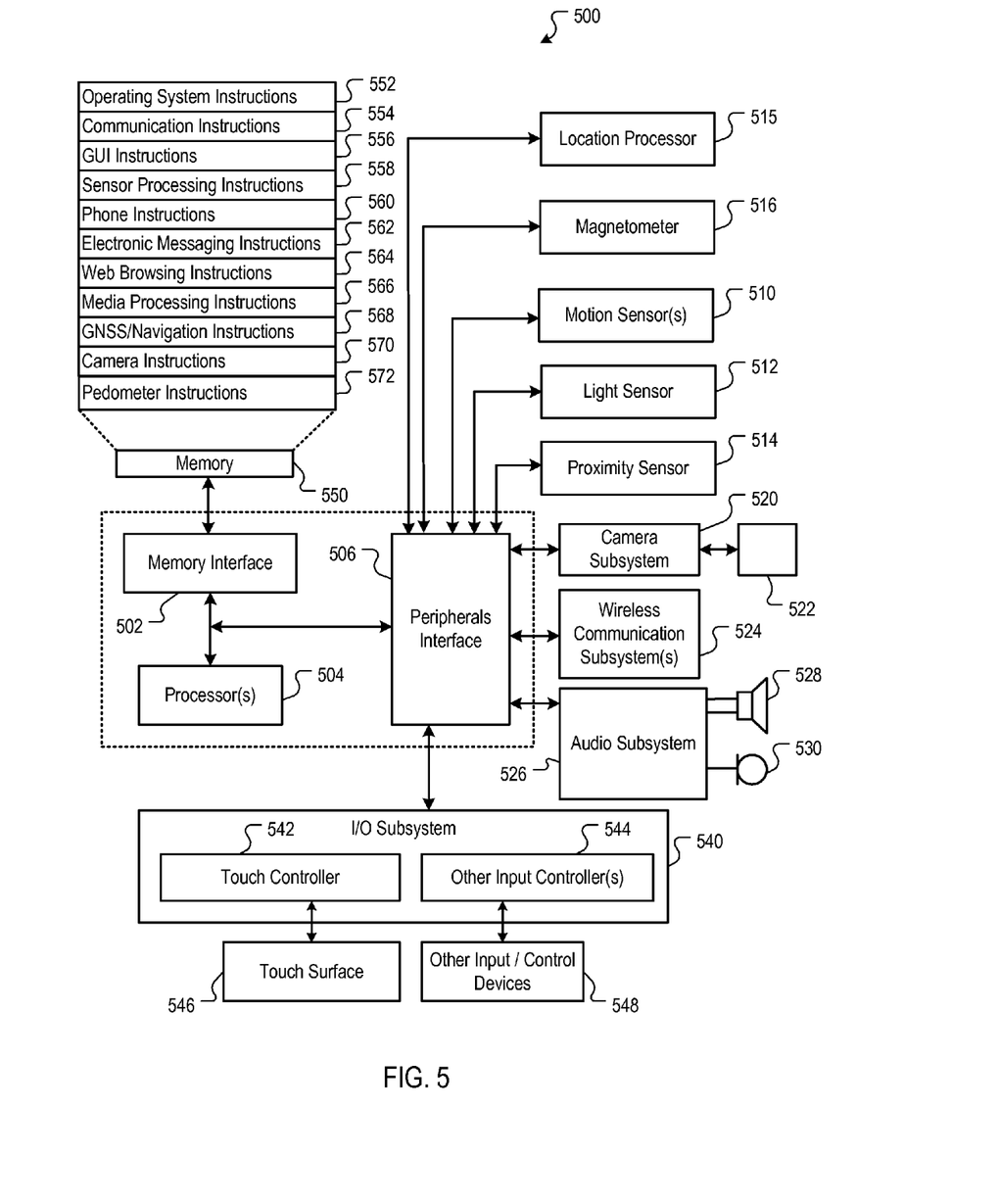
FIG. 5 is a block diagram of example device architecture for implementing the features and processes described in reference to FIGS. 1-4.

FIG. 5 is a block diagram of example device architecture 500 for implementing the features and processes described in reference to FIGS. 1-4. Architecture 500 may be implemented in any mobile device for generating the features and processes described in reference to FIGS. 1-4, including but not limited to smart phones and wearable computers (e.g., smart watches, fitness bands). Architecture 500 may include memory interface 502, data processor(s), image processor(s) or central processing unit(s) 504, and peripherals interface 506. Memory interface 502, processor(s) 504 or peripherals interface 506 may be separate components or may be integrated in one or more integrated circuits. One or more communication buses or signal lines may couple the various components.

Sensors, devices, and subsystems may be coupled to peripherals interface 506 to facilitate multiple functionalities. For example, motion sensor 510, light sensor 512, and proximity sensor 514 may be coupled to peripherals interface 506 to facilitate orientation, lighting, and proximity functions of the device. For example, in some implementations, light sensor 512 may be utilized to facilitate adjusting the brightness of touch surface 546. In some implementations, motion sensor 510 (e.g., an accelerometer, rate gyroscope) may be utilized to detect movement and orientation of the device. Accordingly, display objects or media may be presented according to a detected orientation (e.g., portrait or landscape).

Other sensors may also be connected to peripherals interface 506, such as a temperature sensor, a barometer, a biometric sensor, or other sensing device, to facilitate related functionalities. For example, a biometric sensor can detect fingerprints and monitor heart rate and other fitness parameters.

Location processor 515 (e.g., GNSS receiver chip) may be connected to peripherals interface 506 to provide georeferencing. Electronic magnetometer 516 (e.g., an integrated circuit chip) may also be connected to peripherals interface 506 to provide data that may be used to determine the direction of magnetic North. Thus, electronic magnetometer 516 may be used as an electronic compass.

Camera subsystem 520 and an optical sensor 522, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 524. Communication subsystem(s) 524 may include one or more wireless communication subsystems. Wireless communication subsystems 524 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 524 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystems 524 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 526 may be coupled to a speaker 528 and one or more microphones 530 to facilitate voice-enabled functions, such as voice recognition, voice replication, digital recording, and telephony functions.

I/O subsystem 540 may include touch controller 542 and/or other input controller(s) 544. Touch controller 542 may be coupled to a touch surface 546. Touch surface 546 and touch controller 542 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 546. In one implementation, touch surface 546 may display virtual or soft buttons and a virtual keyboard, which may be used as an input/output device by the user.

Other input controller(s) 544 may be coupled to other input/control devices 548, such as one or more buttons, rocker switches, thumb-wheel, infrared port, USB port, and/or a pointer device such as a stylus. The one or more buttons (not shown) may include an up/down button for volume control of speaker 528 and/or microphone 530.

In some implementations, architecture 500 may present recorded audio and/or video files, such as MP3, AAC, and MPEG video files. In some implementations, device 500 may include the functionality of an MP3 player and may include a pin connector for tethering to other devices. Other input/output and control devices may be used.

Memory interface 502 may be coupled to memory 550. Memory 550 may include high-speed random access memory or non-volatile memory, such as one or more magnetic disk storage devices, one or more optical storage devices, or flash memory (e.g., NAND, NOR). Memory 550 may store operating system 552, such as Darwin, RTXC, LINUX, UNIX, OS X, WINDOWS, or an embedded operating system such as VxWorks. Operating system 552 may include instructions for handling basic system services and for performing hardware dependent tasks. In some implementations, operating system 552 may include a kernel (e.g., UNIX kernel).

Memory 550 may also store communication instructions 554 to facilitate communicating with one or more additional devices, one or more computers or servers, including peer-to-peer communications. Communication instructions 554 may also be used to select an operational mode or communication medium for use by the device, based on a geographic location (obtained by the GPS/Navigation instructions 568) of the device.

Memory 550 may include graphical user interface instructions 556 to facilitate graphic user interface processing, including a touch model for interpreting touch inputs and gestures; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes; camera instructions 570 to facilitate camera-related processes and functions; and pedometer instructions 572 for performing some or all of the features and processes, as described in reference to FIGS. 1-4.

Each of the above identified instructions and applications may correspond to a set of instructions for performing one or more functions described above. These instructions need not be implemented as separate software programs, procedures, or modules. Memory 550 may include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   determining, by a first pedometer of an electronic device, a first step count based on sensor data provided by a motion sensor of the electronic device;
   determining, by a second pedometer of the electronic device, a second step count based on a window of the sensor data;
   responsive to determining that a step was detected by the second pedometer, determining a third step count based on the window of sensor data; and
   determining a corrected step count based on the third step count.

2. The method of claim 1, wherein determining the first step count comprises:
   detecting crossings of the sensor data about a threshold; and
   generating the first step count from the detected crossings.

3. The method of claim 1, wherein determining the second step count comprises:
   applying a window function to the sensor data to generate windowed sensor data;
   storing the windowed sensor data;
   applying a frequency filter to the windowed sensor data; and
   generating the second step count based on the filtered windowed sensor data.

4. The method of claim 3, wherein determining the third step count comprises:
   adjusting a detection rate of the first pedometer;
   inputting the stored windowed sensor data into the first pedometer;
   detecting crossings of the stored windowed sensor data about a threshold; and
   generating the third step count from the detected crossings.

5. The method of claim 4, wherein the threshold is fixed and adjusting a detection rate of the first pedometer comprises:
   adjusting the fixed threshold.

6. The method of claim 4, wherein the threshold is fixed and adjusting a detection rate of the first pedometer comprises:
   replacing the fixed threshold with an adaptive threshold.

7. The method of claim 1, wherein determining the third step count further comprises verifying or disproving steps in the third step count using the second step count.

8. The method of claim 1, wherein determining a corrected step count comprises:

comparing the first step count with the third step count to determine a number of missed steps; and adjusting a current step count based on the comparing.

9. The method of claim 1, further comprising:

responsive to determining that a step was not detected by the second pedometer, subtracting the first step count from a current step count.

10. The method of claim 1, further comprising:

correcting a current step count over a time period using the determined corrected step count.

11. A system comprising:

one or more processors;

memory coupled to the one or more processors and configured to store instructions, which, when executed by the one or more processors, causes the one or more processors to perform operations comprising:

determining, by a first pedometer of an electronic device, a first step count based on sensor data provided by a motion sensor of the electronic device;

determining, by a second pedometer of the electronic device, a second step count based on a window of the sensor data;

responsive to determining that a step was detected by the second pedometer, determining a third step count based on the window of sensor data; and determining a corrected step count based on the third step count.

12. The system of claim 11, wherein determining the first step count comprises:

detecting crossings of the sensor data about a threshold; and generating the first step count from the detected crossings.

13. The system of claim 11, wherein determining the second step count comprises:

applying a window function to the sensor data to generate windowed sensor data;

storing the windowed sensor data;

applying a frequency filter to the windowed sensor data; and generating the second step count based on the filtered windowed sensor data.

14. The system of claim 13, wherein determining the third step count comprises:

adjusting a detection rate of the first pedometer;

inputting the windowed sensor data into the first pedometer;

detecting crossings of the windowed sensor data about a threshold; and generating the third step count from the detected crossings.

15. The system of claim 14, wherein the threshold is fixed and adjusting a detection rate of the first pedometer comprises:

adjusting the fixed threshold.

16. The system of claim 14, wherein the threshold is fixed and adjusting a detection rate of the first pedometer comprises:

replacing the fixed threshold with an adaptive threshold.

17. The system of claim 11, wherein determining the third step count further comprises verifying or disproving steps in the third step count using the second step count.

18. The system of claim 11, wherein determining a corrected step count comprises:

comparing the first step count with the third step count to determine a number of missed steps; and adjusting a current step count based on the comparing.

19. The system of claim 11, further comprising:

responsive to determining that a step was not detected by the second pedometer, subtracting the first step count from a current step count.

20. The system of claim 11, further comprising:

correcting a current step count over a time period using the determined corrected step count.

* * * * *